April 14, 1970 H. S. STARBUCK ET AL 3,506,248

TOWER PACKING UNIT

Filed Feb. 21, 1968 4 Sheets-Sheet 1

INVENTORS
HERMAN S. STARBUCK
NEAL BROOKS

BY J. Warren Kinney, Jr.
ATTORNEY

INVENTORS
HERMAN S. STARBUCK
NEAL BROOKS
BY
J. Warren Kinney, Jr.
ATTORNEY

April 14, 1970 H. S. STARBUCK ET AL 3,506,248

TOWER PACKING UNIT

Filed Feb. 21, 1968 4 Sheets-Sheet 3

INVENTORS
HERMAN S. STARBUCK
NEAL BROOKS

BY J. Warren Kinney, Jr.
ATTORNEY

TOWER PACKING UNIT

Filed Feb. 21, 1968

BY
INVENTORS
HERMAN S. STARBUCK
NEAL BROOKS

J. Warren Kinney, Jr.
ATTORNEY

United States Patent Office 3,506,248

Patented Apr. 14, 1970

3,506,248

TOWER PACKING UNIT

Herman S. Starbuck, Cincinnati, Ohio, and Neal Brooks, Florence, Ky., assignors, by mesne assignments, to United Air Specialists, Inc., Cleveland, Ohio, a corporation of Ohio Filed Feb. 21, 1968, Ser. No. 707,204
Int. Cl. B01d 47/14
U.S. Cl. 261—94 5 Claims

ABSTRACT OF THE DISCLOSURE

Tower packing units of polyvinylchloride having interconnected, concentric tubular walls are produced by cutting off successive sections from a long tubular extrusion which presents extensive gas-liquid contact surfaces and effective internal reinforcing structure, with a highly desirable reduction in weight of the units.

The present invention relates to a tower packing unit. The packing units, sometimes collectively referred to as filling material, may be bulk-dumped or otherwise introduced into a reaction tower or column in gas-liquid contact processes and the like. Such packing units are useful in various processes including the mixing or the separation of gases and liquids, for example, and for other purposes well known in the art of gas-liquid mixing and separation as well as related fields of endeavor.

Another object of the invention is to provide an improved packing unit of rigid light-weight but durable material, which will not nest with other similar units in a tower or reactor bed to objectonably increase the pressure drop of fluid passing through the tower or bed.

Another object is to provide an improved packing unit which has a very low ratio of solid mass to wettable surfaces, said surfaces being extraordinarily extensive and favorably exposed for maximum gas-liquid contact, and for changing most frequently the direction of flow of a fluid through a bed of such packing units.

A further object of the invention is to substantially reduce the weight and increase the efficiency of packing units, so that the towers or other receptacles used for confining the units may be constructed simply and economically without the great structural strength usually required for the confinement of heavier packing units.

Another object of the invention is to provide an improved packing unit which is easily cleaned, and which performs its intended function with a minimum of resistance to flow of fluid through a bed or column of such units.

The foregoing and other objects are attained by the means described herein and illustrated upon the accompanying drawings, in which.

Figures 1, 2:
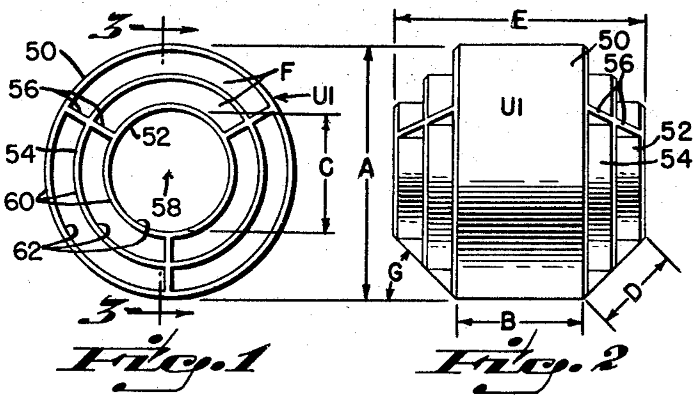
FIG. 1 is an end view of a tubular packing unit of the present invention, as severed from a long tubular extrusion exemplefied very generally in FIG. 28, which depicts also a severing or cut-off tool used in the production of individual packing units.
FIG. 2 is a side elevation of FIG. 1.
Figure 4:
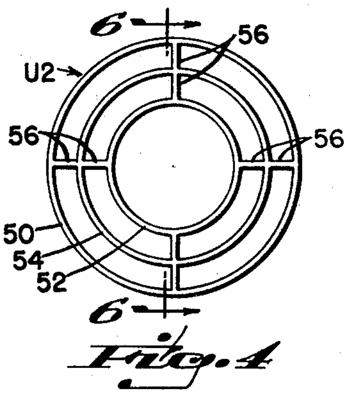
FIGS. 4, 5 and 6 are views corresponding to FIGS. 1, 2 and 3, respectively, showing a modification.
Figure 5:
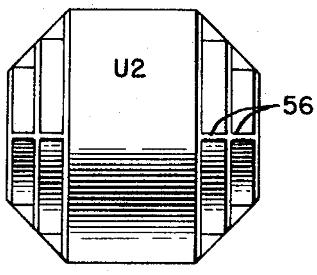
Figure 6:
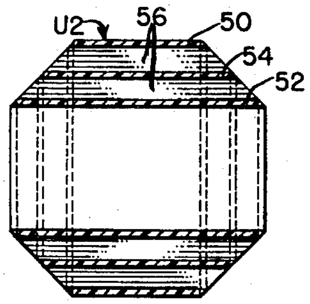
Figure 7:
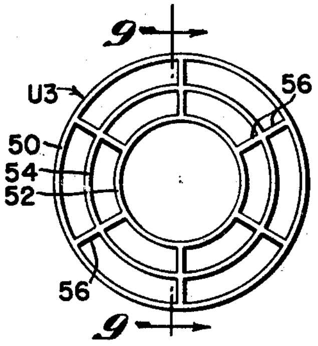
FIGS. 7, 8 and 9 are views corresponding to FIGS. 1, 2 and 3, respectively, showing another modification.
Figure 8:
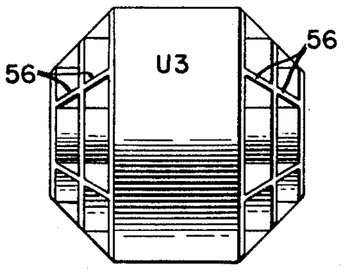
Figures 28, 29, 30, 31, 32, 33, 34:
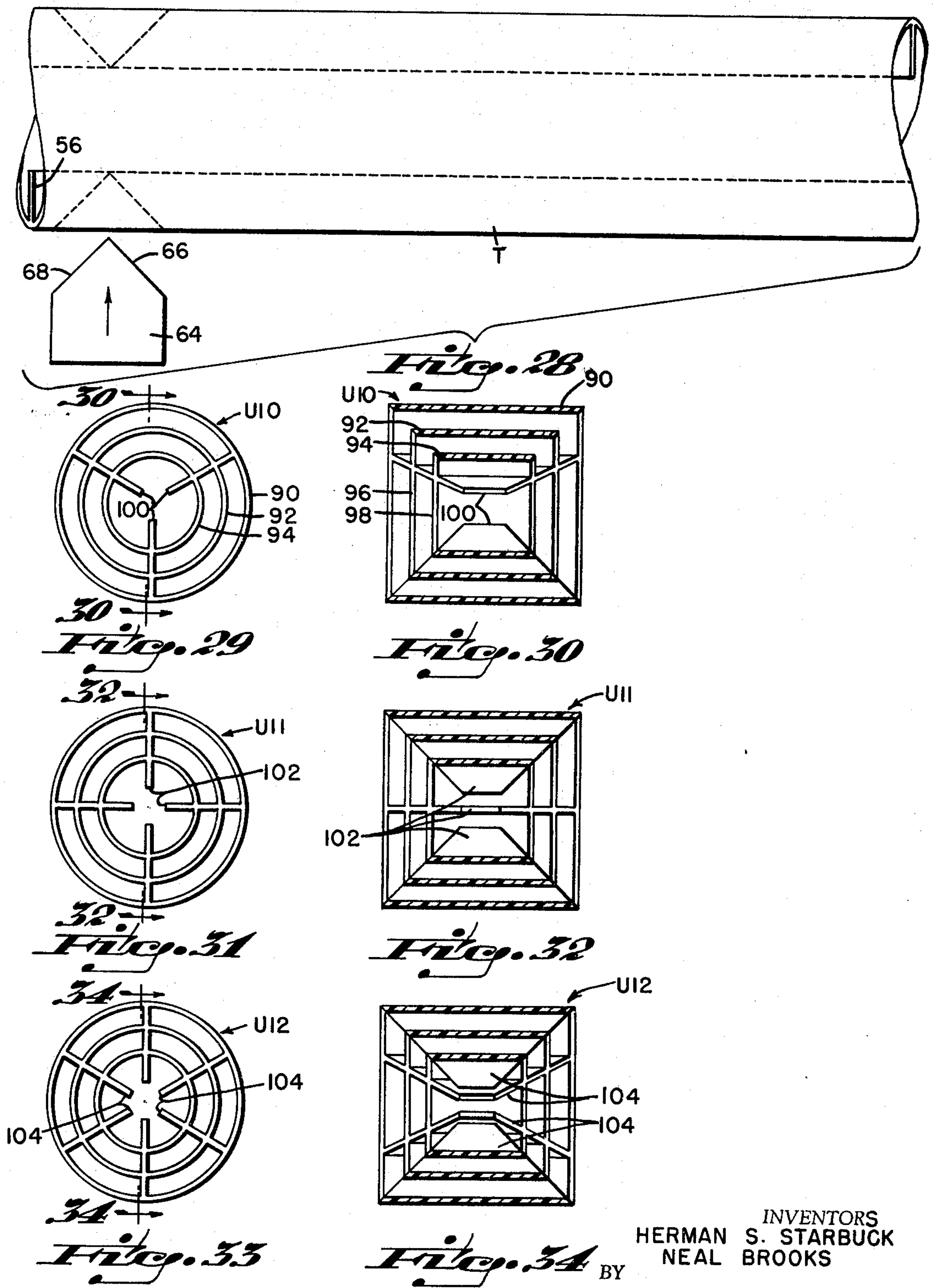
FIG. 28 is a plan view showing a long tubular extrusion to be cut into short sections by means of a cut-off tool, for producing the various packing units illustrated.

FIGS. 29, 31 and 33 are end views showing modifications of the packing units of FIGS. 1, 4 and 7, respectively, and FIGS. 30, 32 and 34 are cross-sections taken on lines 30—30, 32—32 and 34—34, respectively, of FIGS. 29, 31 and 33.

The packing units of this invention are designed for use in a tower or bed, substantially as and for the purposes disclosed in the U.S. Patent of A. J. Teller, No. 2,867,425, dated Jan. 6, 1959, or in equivalent situations involving mass transfer of liquids or gases by liquid-gas contact processes.

Figure 3:
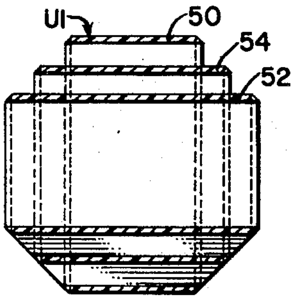
FIG. 3 is a cross-section taken on line 3—3 of FIG. 1.

The packing unit U1, FIGS. 1, 2 and 3, is a hollow tubular body of rigid plastic material, which comprises an outer continuous, peripheral wall 50, an inner continuous wall 52, and at least one continuous intermediate wall 54 located between the walls 50 and 52 preferably in equally spaced concentricity therewith. The walls 50, 52 and 54 are tubular in cross-section, and are supported in spaced relationship by means of integral substantially radial connecting walls or fins 56.

The packing unit has a central or principal axis 58. A plane which includes such axis 58 will intersect wall 50 along two opposite lines which are equidistant from axis 58; similarly, such a plane will intersect wall 52 along two opposite lines which are equidistant from axis 58; and the same applies to intermediate wall 54. Such equidistant intersections apply to packing units which are exteriorly cylindrical, as exemplified by FIGS. 1 through 9, and also to angular packing units of any regular geometric cross-section as exemplified by FIGS. 10 through 18.

The gas-liquid contact surfaces of the unit walls are the outer surfaces 60 and the inner surfaces 62, and the radial connecting walls 56 have opposite contact surfaces as shown. As FIG. 3 clearly indicates, the length dimension of walls 50, 54 and 52, increase progressively in the direction of the unit axis, which is horizontal in FIG. 3.

The packing unit of FIGS. 1, 2, 3 may be mass-produced very economically as follows. A plastic extrusion machine is provided with a die which is formed complementarily to the FIG. 1 configuration, and through said die is expressed continuously a liquefied plastic mass which solidifies upon leaving the die. The resultant extrusion product will be an elongate tube having the cross-sectional configuration of FIG. 1. Such a tube is shown at T, FIG. 28, and may be of any length dimension.

At 64, FIG. 28, is shown a cut-off tool having cutting edges 66 and 68 meeting at a 90 degree angle, which tool may be advanced while tube T rotates, to sever an end section from the tube. Upon completion of a cut, either the tube or the tool may be traversed to perform a subsequent cut-off, which will result in producing the unit shape of FIG. 2, in elevation. The traverse of the tool relative to the work T may approximate the overall diameter of T, in order to produce the FIG. 2 shape. Also, the indicated shape presupposes cutting edges 66 and 68 which are straight, and disposed at right angles to one another. Instead of being straight, the edges 66 and 68 may be concave, so as to impart a curvature to the cut tending to shape the unit generally as a sphere.

In performing the process, the tube T may be axially rotated while tool 64 is fed toward the axis of rotation, or if preferred, tube T may be held stationary while tool 64 revolves about the tube and feeds toward the tube axis to cut-off position. In either case, the extent of the tool feed will be determined by the radial reach of connecting wall or fin 56 toward the tube axis.

With the use of a cut-off tool such as 64, the packing unit of FIGS. 1, 2 and 3 may be produced wherein the axial length E may be equal to the diameter A, and dimensions B and D may be equal to C, while the angle G approximates 45 degrees. The spaces F, F between the walls 50, 52 and 54 may by preference be equal. If preferred, the cuts needed to produce the unit may be performed by high-speed abrasive wheels or similar rotary cutters instead of cutting tools of the type suggested at 64. By either cutting method, the scrap produced is re-usable in the extrusion phase of the process.

If polyvinylchloride is used in producing the packing units according to the procedure above recited, the gas-liquid contact surfaces of the units will be found greatly superior in effectiveness, and the various walls of the unit may be desirably reduced in thickness to obtain a very low ratio of solid mass to wettable surface area, without sacrifice of the structural strength necessary to avoid collapse of the units when piled up within a reactor tower. The unit walls may safely be reduced in thickness to .040 inch or less, with a substantial reduction of unit weight. By so limiting the weight of the packing units, and increasing their efficiency, great savings may be effected in simplifying and reducing the weight and size of structural members used in building the reactor tower or other confining structure for the units.

It is possible, of course, to produce the packing units by means of the injection molding method, and with the use of various types of plastic materials. For best results, however, the plastic material employed should be polyvinylchloride, or a material of the class of polyvinylchloride, treated and formed by the extrusion method related above.

The accompanying drawings disclose various examples suggesting how the units might be cut from elongate extrusions of different cross-sectional shapes, according to the method or methods mentioned in explaining FIG. 28.

Unit U2 (FIGS. 4, 5, 6), is quite similar to unit U1, but has a greater number of radial connecting walls or fins 56 joining the principal concentric walls of the structure. The U2 modification is meant to suggest the possibility of increasing substantially the number of radial connecting walls employed.

Unit U3, (FIGS. 7, 8, 9), illustrates the use of six radial connecting walls or fins 56, which increase the wettable surface area substantially over the U1 structure, and at the same time enhance the structural strength of the unit as well as its ability to induce more effective direction changes of fluid flow through the unit.

Unit U4, (FIGS. 10, 11, 12), is distinguished from the preceding units mainly in that it is formed from a tubular elongate extrusion which, instead of being cylindrical, is polygonal (hexagonal) in cross section, as to its principal tubular walls 72, 74, 76. The curvatures at the outer terminal ends of the walls 72, 74, 76 result from axially turning the hexagonal tube in accordance with FIG. 28, using a tool such as 64 having straight cutting edges as shown.

Unit U5, (FIGS. 13, 14, 15) differs from unit U4 in the number of radial connecting walls or fins 56, and the regularity of their disposition between the principal tubular walls 72, 74, 76 constituting the unit. Unit U5 has a wettable surface of increased area, by an amount resulting from the added fins 56.

Unit U6, (FIGS. 16, 17, 18), is formed from an extrusion which is octagonal in cross-section, and subjected to the treatment suggested by FIG. 28. The principal tubular walls are denoted 80, 82, 84, and are spaced by the fins or radial connecting walls 56. The walls 80, 82, 84, are each octagonal in form, and the cutting action of the tool 64 in the turning procedure results in curving the opposite terminal ends of said walls as shown.

Figure 20:
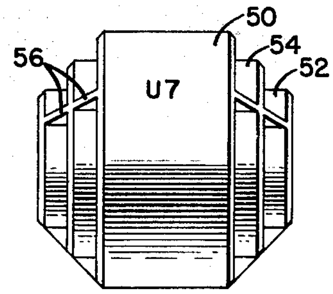
Figure 21:
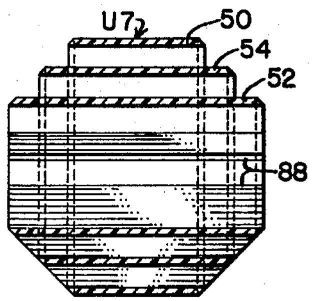

Unit U7, (FIGS. 19, 20, 21), is distinguished from U1 in that the fins or radial connecting walls 56 are inwardly projected as extensions 86 beyond the innermost principal wall 52, terminating in unsupported free edges 88 reaching toward but not to the central axis of the unit. The unit U7 presents a greater area of contact than does U1, and will differently direct a flow of fluid passed therethrough.

Figure 19:
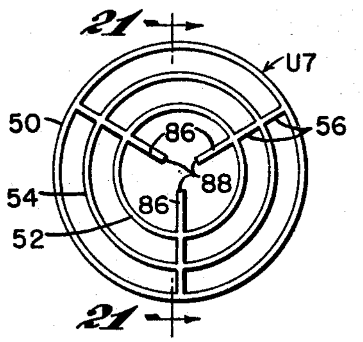
FIGS. 19, 20 and 21 are views corresponding to FIGS. 1, 2 and 3, respectively, showing another modification.
Figure 22:
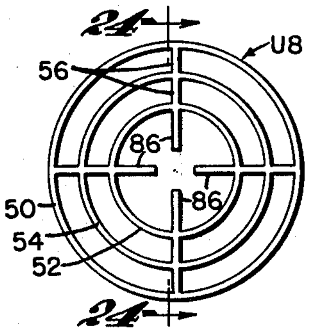
FIGS. 22, 23 and 24 are views corresponding to FIGS. 1, 2 and 3, respectively, showing another modification.
Figure 23:
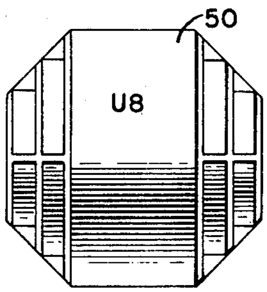
Figure 24:
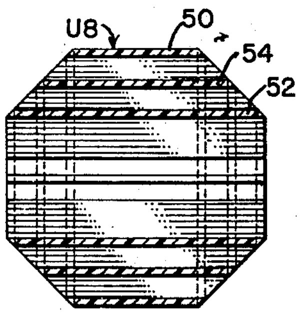

Unit U8, (FIGS. 22, 23, 24) is distinguished from U2 in the provision of inwardly projected fin extensions 86 similar to the extensions 86 of FIG. 19.

Figure 25:
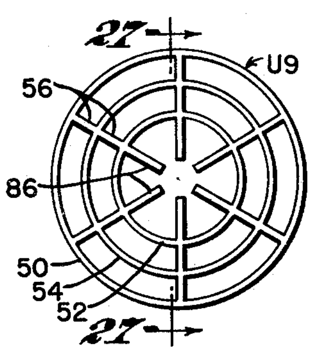
FIGS. 25, 26 and 27 are views corresponding to FIGS. 1, 2 and 3, respectively, showing another modification.
Figure 26:
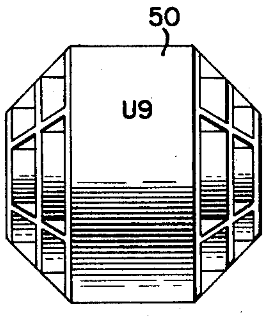
Figure 27:
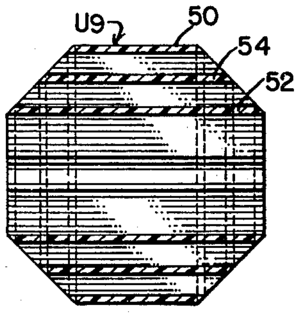

Unit U9, (FIGS. 25, 26, 27), is quite similar to unit U3 of FIG. 7, but incorporates a substantial number of fin extensions 86 which affect substantially the nature and extent of fluid flow deflection through the unit.

Figure 9:
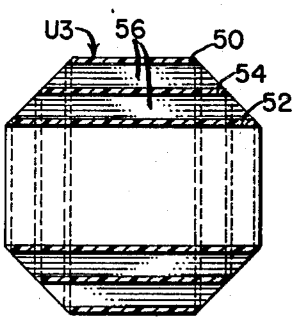
Figure 10:
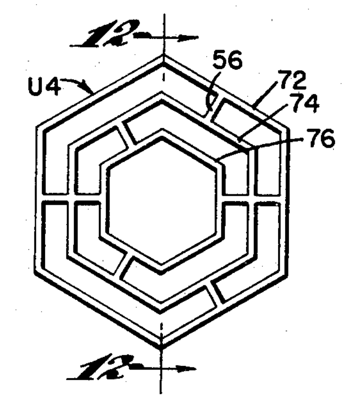
FIGS. 10, 11 and 12 are views corresponding to FIGS. 1, 2 and 3, respectively, showing another modification.
Figure 11:
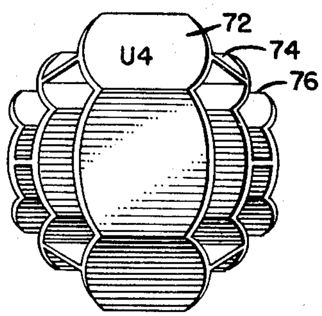
Figure 12:
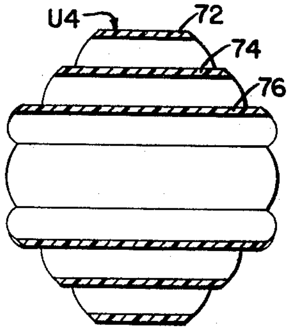
Figure 13:
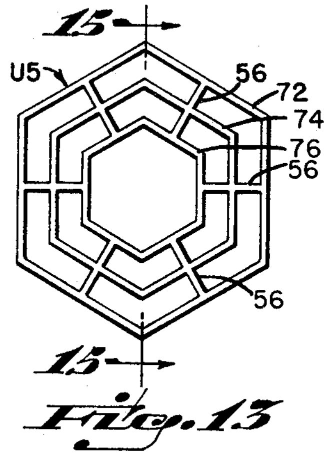
FIGS. 13, 14 and 15 are views corresponding to FIGS. 1, 2 and 3, respectively, showing another modification.
Figure 14:
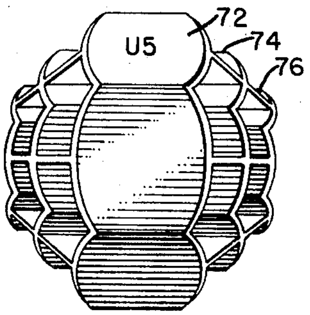
Figure 15:
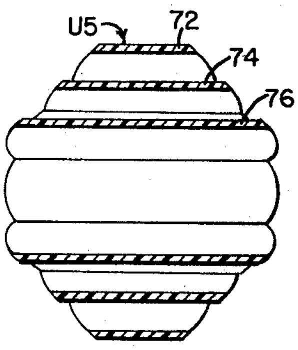
Figure 16:
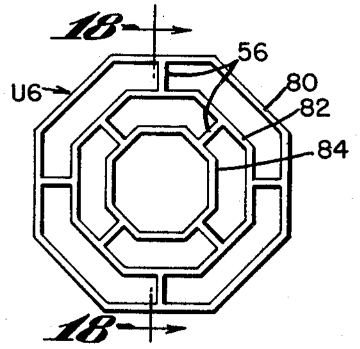
FIGS. 16, 17 and 18 are views corresponding to FIGS. 1, 2 and 3, respectively, showing another modification.
Figure 17:
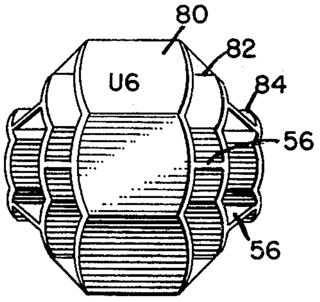
Figure 18:
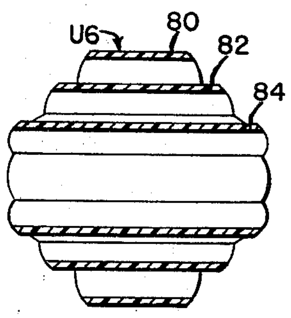

Unit U10, (FIGS. 29 and 30), is materially distinct from U7 of FIG. 9, in that U10 has an outer tubular wall 90 of greater axial length than the inner walls 92 and 94. Note that in FIG. 21, unit U7, the innermost wall 52 is the greater in length, whereas in unit U10 (FIG. 30) the outermost wall 90 is the greater in length. The U10 construction requires an angle cut of the cut-off tool inwardly from the opposite ends of the unit, so that the opposite ends are in effect inverse conical concavities wherein are exposed the annular ends 96 and 98 of walls 92 and 94, respectively. In producing the U10 unit, an acceptable procedure is that of cutting or sawing the tubular extrusion transversely to produce individual lengths. Then the individuals may be cut or ground endwise, or axially, to reduce the length of walls 92 and 94 according to FIG. 28. In this construction, it will be noted, the fins terminate interiorly of the unit with a free edge 100 greatly reduced in length. The tubular extrusion in this case may be either cylindical or polygonal of cross-section. If the extrusion is polygonal, the unit ends will have the form of an inverse truncated polygonal pyramid.

Unit U11, (FIGS. 31 and 32), is very similar to U10 above described, and may be produced by the same procedure from a tubular extrusion which has four fin extensions 102 instead of the three fin extensions 100 of FIG. 29.

Unit U12, (FIGS. 33 and 34), differs from units U10 and U11, in that it is produced from a tubular extrusion which has a substantial number of radial fins and extensions thereof, exemplified by the six fins denoted 104 in the drawing figures. The showing of a substantial number of fins is meant to imply that fins in infinite numbers might be provided if desired. The procedure for producing unit U12 may be the same as that outlined in the explanation concerning FIGS. 29 and 30, and unit U10 thereof.

Packing units produced according to the present invention are light in weight, yet possess the structural strength needed to avoid collapse or breakage when piled to maximum height within the reactor towers or columns of gas-liquid contact equipment for various purposes. The improved units present maximum wettable surface areas per unit volume, and when dump-loaded into a reactor chamber the units afforded a great number of fluid-flow direction changes at a minimum pressure drop. The units as formed cannot nest to increase the pressure drop or depreciate the affective contact area within the reactor bed.

In addition to the foregoing advantages, the improved packaging units are inexpensive yet highly efficient in service, and will perform throughout extended periods of service without frequent cleaning or other attention. Various other advantages have been mentioned hereinbefore, and still others will become manifest to persons skilled in the art to which the invention appertains.

It is to be understood that various modifications and changes may be made in the product herein disclosed, within the scope of the appended claims without departing from the spirit of the invention.

What is claimed is:

1. A tower packing unit comprising: a substantially rigid plastic body having a thin open-ended outer tubular wall with a central axis; a thin open-ended inner tubular wall concentric with said outer tubular wall; and a plurality of thin radial connecting fins extending between said inner and outer tubular walls, said fins serving to space said inner wall and said outer wall concentrically and to provide passageways for fluid entering and leaving the open ends of said walls, said outer tubular wall and said inner tubular wall spaced therefrom being imperforate to present extensive outer and inner gas-liquid contact surfaces for mass transfer of gas or liquid passed through said tubes, said inner wall and said outer wall being of different length dimensions in the direction of said central axis.

2. The article as specified by claim 1, wherein said connecting fins are extended beyond said inner wall toward said central axis.

3. The tower packing unit claimed in claim 1 including at least one open-ended intermediate tubular wall concentric with said inner and outer tubular walls and disposed therebetween.

4. The packing unit as specified by claim 3, wherein the length of the intermediate tubular wall is less than the length of the inner tubular wall, and greater than the length of the outer tubular wall, so as to impart to the body a generally spherical formation.

5. The packing unit as specified by claim 3, wherein the length of the intermediate tubular wall is greater than the length of the inner tubular wall, and less than the length of the outer tubular wall, so as to impart concavity to the opposite ends of the unit body.

References Cited

UNITED STATES PATENTS

| | | | |
|---|---|---|---|
| 598,351 | 2/1898 | Staub | 261—95 X |
| 2,183,657 | 12/1939 | Page | 261—95 |
| 2,212,932 | 8/1940 | Fairlie | 261—94 |
| 2,739,118 | 3/1956 | Carey | 210—150 X |
| 3,006,436 | 10/1961 | Starbuck et al. | 261—95 X |

FOREIGN PATENTS

| | | |
|---|---|---|
| 560,882 | 10/1923 | France. |
| 612,686 | 10/1926 | France. |
| 750,093 | 8/1933 | France. |
| 317,166 | 2/1918 | Germany. |
| 319,558 | 10/1920 | Germany. |
| 200,956 | 7/1923 | Great Britain. |

TIM R. MILES, Primary Examiner

U.S. Cl. X.R.

264—150